(12) United States Patent
Lee

(10) Patent No.: US 8,857,008 B2
(45) Date of Patent: Oct. 14, 2014

(54) CLIP MEMBER FOR ASSEMBLING VARIOUS MOUNTING TYPES OF WIPER ARMS

(71) Applicants: HS Technology Co., Ltd., Incheon (KR); Dongyang Mechatronics Corp., Incheon (KR)

(72) Inventor: Jeong Goo Lee, Seoul (KR)

(73) Assignees: HS Technology Co., Ltd. (KR); Dongyang Mechatronics Corp. (KR)

( * ) Notice: Subject to any disclaimer, the term of this patent is extended or adjusted under 35 U.S.C. 154(b) by 0 days.

(21) Appl. No.: 14/074,164

(22) Filed: Nov. 7, 2013

(65) Prior Publication Data

US 2014/0123427 A1 May 8, 2014

(30) Foreign Application Priority Data

Nov. 7, 2012 (KR) .................. 10-2012-0125707

(51) Int. Cl.
*B60S 1/40* (2006.01)
*B60S 1/38* (2006.01)

(52) U.S. Cl.
CPC .............. *B60S 1/4003* (2013.01); *B60S 1/407* (2013.01); *B60S 1/3801* (2013.01); *B60S 1/4077* (2013.01)
USPC ................................ 15/250.32; 15/250.44

(58) Field of Classification Search
CPC ...... B60S 1/4003; B60S 1/4067; B60S 1/407; B60S 1/4074; B60S 1/4077
USPC ............. 15/250.32, 250.43, 250.44, 250.201
See application file for complete search history.

(56) References Cited

U.S. PATENT DOCUMENTS

| 2004/0074037 A1* | 4/2004 | Op't Roodt ................ 15/250.32 |
| 2004/0093681 A1* | 5/2004 | Op't Roodt ................ 15/250.32 |
| 2006/0021179 A1* | 2/2006 | Yang et al. ................. 15/250.32 |
| 2013/0212826 A1* | 8/2013 | Lee ............................ 15/250.32 |

FOREIGN PATENT DOCUMENTS

| KR | 200334423 Y1 | 12/2003 |
| KR | 20080011166 A | 1/2008 |
| KR | 2020090001292 U | 2/2009 |
| KR | 20110000855 A | 1/2011 |
| KR | 20110021443 A | 3/2011 |
| KR | 20120038900 A | 4/2012 |

OTHER PUBLICATIONS

Korean Intellectual Property Office Notice of Allowance Application No. 10-2012-0125707 Issued: Feb. 20, 2013 2 pages.

* cited by examiner

*Primary Examiner* — Gary Graham
(74) *Attorney, Agent, or Firm* — St. Onge Steward Johnston & Reens LLC

(57) ABSTRACT

A clip member for mounting various types of wiper arms including: a main body; a combination groove unit that is detachably combined with a lever member; a first mounting unit that is a concave groove formed in an upper surface of the main body, and is combined with a slide-arm wiper arm; a second mounting unit that is a hole passing through a sidewall of the main body in the width direction of the main body to be combined with a pin unit of a slide-arm wiper arm or a pin-arm wiper arm; and a third mounting unit that is formed on an outer side from one of both side surfaces of the main body opposite the wiper arm and that wraps around a sidewall of the clip in the manner of a hat.

2 Claims, 7 Drawing Sheets

CLIP MEMBER FOR ASSEMBLING VARIOUS MOUNTING TYPES OF WIPER ARMS

FIELD OF THE INVENTION

The present invention relates to a clip member for a wiper blade device of a vehicle, and more particularly, to a clip member for assembling various mounting types of wiper arms.

BACKGROUND OF THE INVENTION

A blade assembly for cleaning a windshield (the front window) of a vehicle is a convenience and active safety device installed to ensure the visibility of a driver by removing foreign materials or rain from the front window of the vehicle.

Generally, the blade assembly for cleaning the front window of a vehicle includes a wiper strip that has elasticity to slidingly contact the front window, a supporting member for elastically supporting the wiper strip, and a retainer connector that are connection assembly for solidly fixing the wiper strip on a wiper arm. Generally, a contact error occurs between the wiper strip and the front window due to a curvature difference between the wiper strip and the front window. Thus, in order to compensate for the contact error, the retainer has a tournament structure.

Recently, to improve the performance of vehicles, various types of high speed wiper blade devices have been developed. An example of such a high speed wiper blade device has been disclosed in Korean Patent Publication No. 2012-0038900.

Generally, a wiper blade device and a wiper arm are combined by using a clip member installed at a central region of the wiper blade device. An example of such a clip member has been disclosed in Korean Utility Model Registration No. 0334423.

However, there are several types of wiper arms according to the types of vehicles such as wiper arms of a U-hook type, a pin arm type, and a slide arm type according to a mounting part that is combined with the wiper blade. The wiper blade that is combined with the wiper arm uses an exclusive clip member appropriate for the type of a vehicle. However, when the wiper blade device is worn out after the vehicle used for a certain period of time, the driver may replace the wiper blade device with a new wiper blade device according to his taste and need. In this case, although the driver wants to mount a wiper blade of a new type on the wiper blade device according to his/her taste, the wiper blade may not be mounted due to a different mounting structure between the wiper arm of the driver's vehicle and the new wiper blade.

Accordingly, there is a need to develop a clip member that can be widely used for mounting various types of wiper arms regardless of the types of vehicles.

SUMMARY OF THE INVENTION

The present invention provides a clip member that has an improved structure so that various mounting types of wiper arms may be mounted on a wiper blade device according to a driver's taste regardless of the mounting type of the wiper blade device.

According to an aspect of the present invention, there is provided a clip member for mounting various types of wiper arms, the clip member being rotatably mounted at a center of a wiper blade device in a length direction thereof, the clip member including, a main body, a combination groove unit that is attachably and detachably combined with a pivot axis provided on a lever member to be rotatably accommodated in a clip accommodation hole that is formed in the lever member in the wiper blade device, a first mounting unit that is a concave groove formed in an upper surface of the main body, extends in a width direction of the main body, and is combined with a slide arm type wiper arm, a second mounting unit that is a hole passing through sidewalls of the main body in the width direction of the main body and is formed at a position of the clip member separated from the combination groove unit in a length direction of the main body to be combined with a pin unit of a slide arm type wiper arm or a pin arm type wiper arm, and a third mounting unit that is formed on an outer side from one of both side surfaces of the main body opposite the wiper arm, has a flange structure connected to an upper part of the main body, and is combined with a sidewall of the clip accommodation hole formed in the lever member like a hat wearing shape.

The clip member may further include a moving prevention bead that is convexly formed on the first mounting unit, has a bead type structure extending in the length direction of the main body, and prevents moving of the slide arm type wiper arm until the slide arm type wiper arm is combined with the clip member.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereafter, the present invention will be described more fully with reference to the accompanying drawings, in which exemplary embodiments of the present invention are shown.

Figure 1:
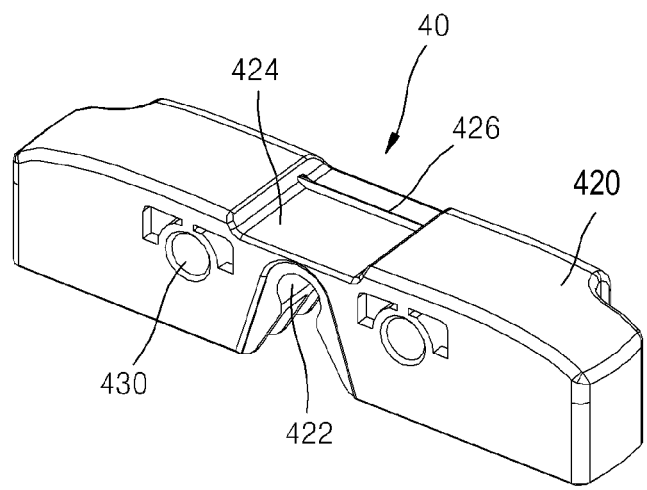
FIG. 1 is a schematic perspective view of a clip member according to an embodiment of the present invention.
Figure 2:
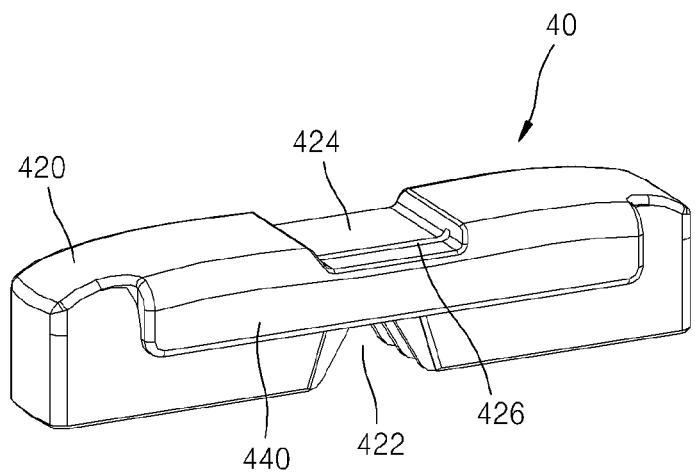
FIG. 2 is a schematic perspective view of the clip member of FIG. 1 seen from another direction.
Figure 3:
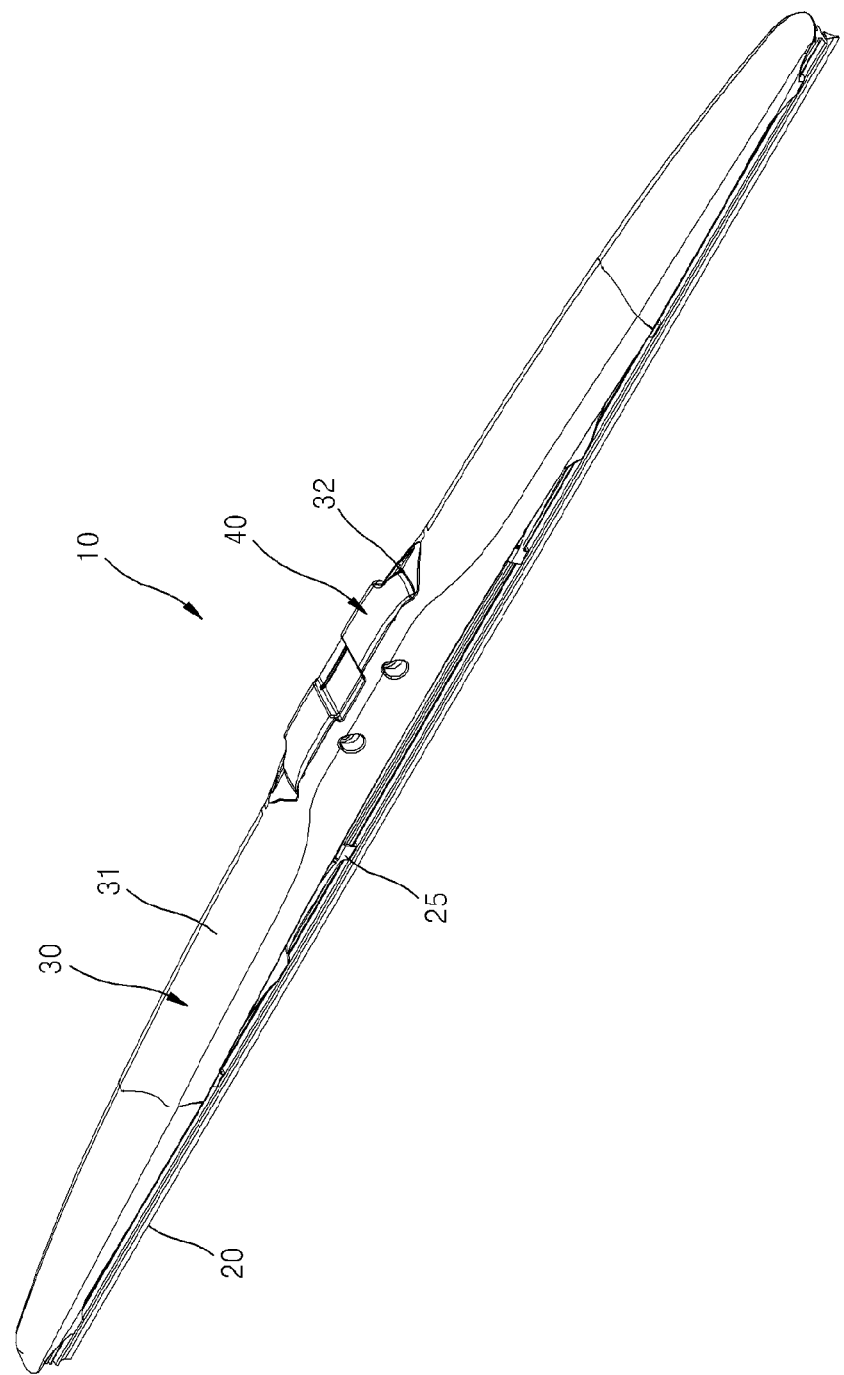
FIG. 3 is a schematic perspective view of a wiper blade device having the clip member of FIG. 1.
Figure 4:
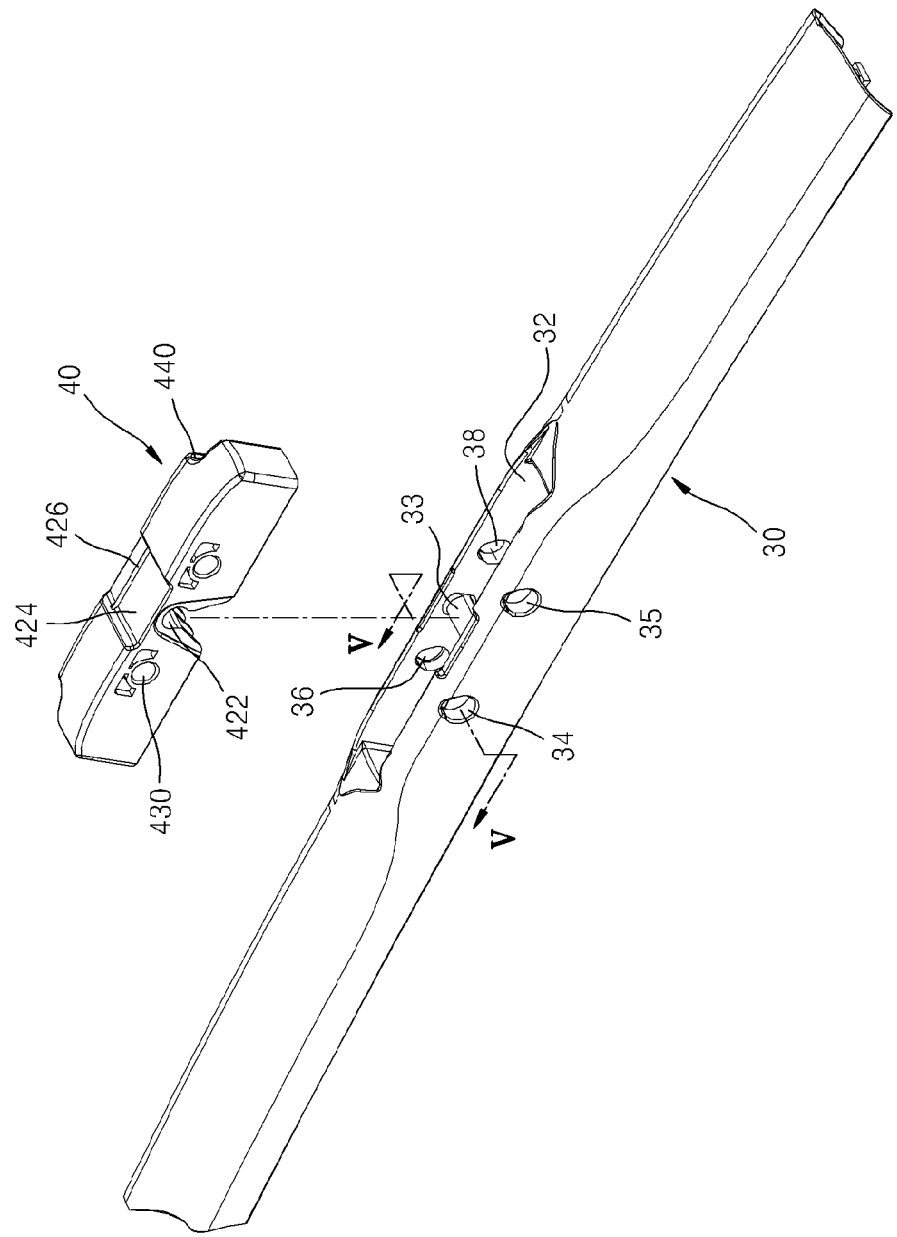
FIG. 4 is an exploded perspective view of a lever member and a clip member that constitute the wiper blade device of FIG. 3.
Figure 5:
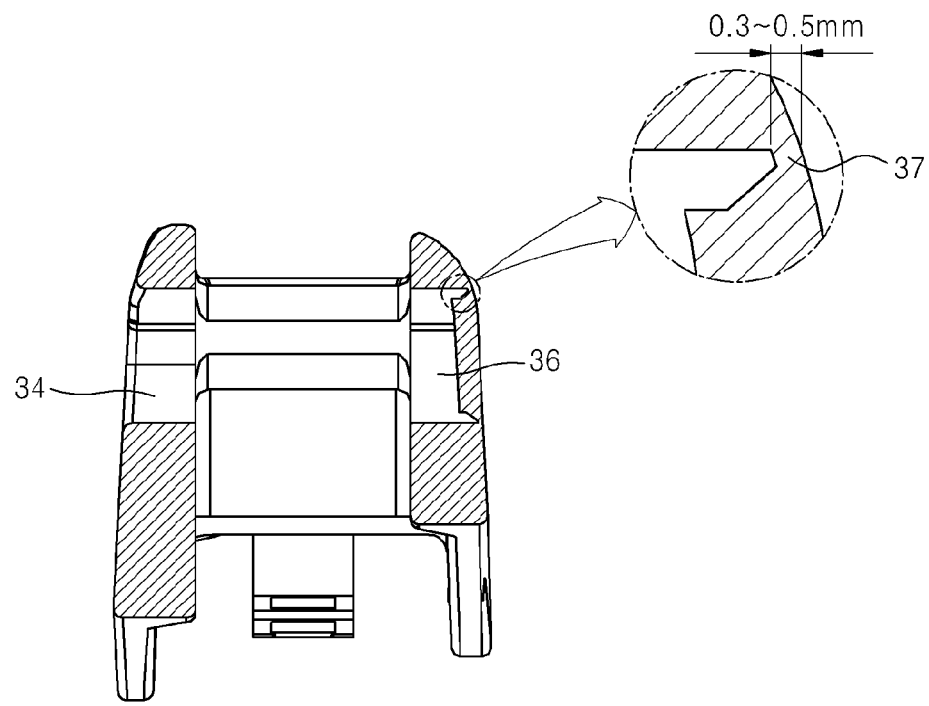
FIG. 5 is a cross-sectional view of the lever member taken along the line V-V of FIG. 4.
Figure 6:
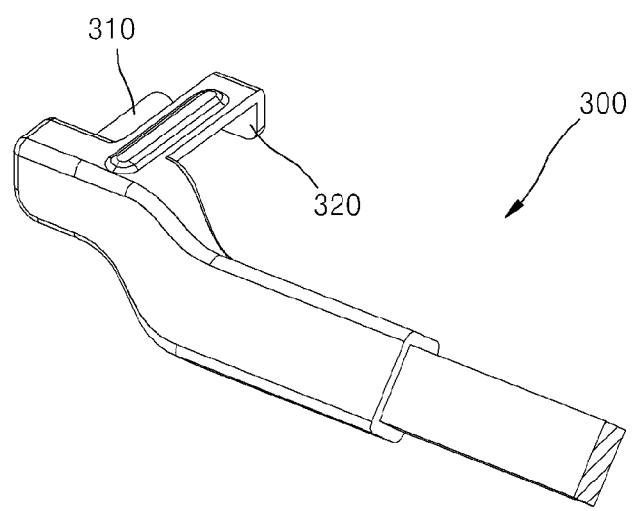
FIG. 6 is a partial perspective view of a slide-arm type wiper arm structure.
Figure 7:
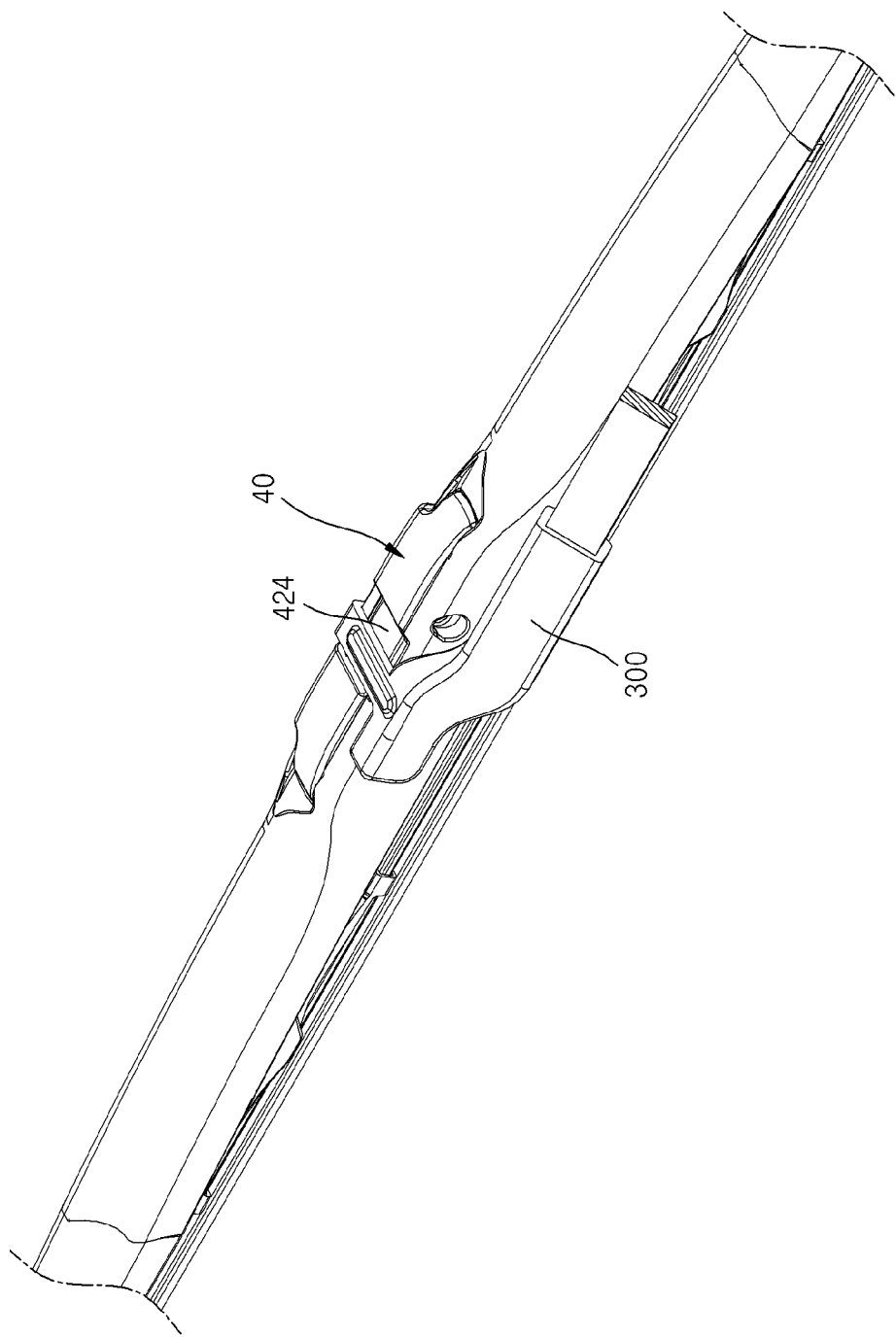
FIG. 7 is a perspective view of a wiper blade device in which a wiper arm of FIG. 6 is combined with a clip member.
Figure 8:
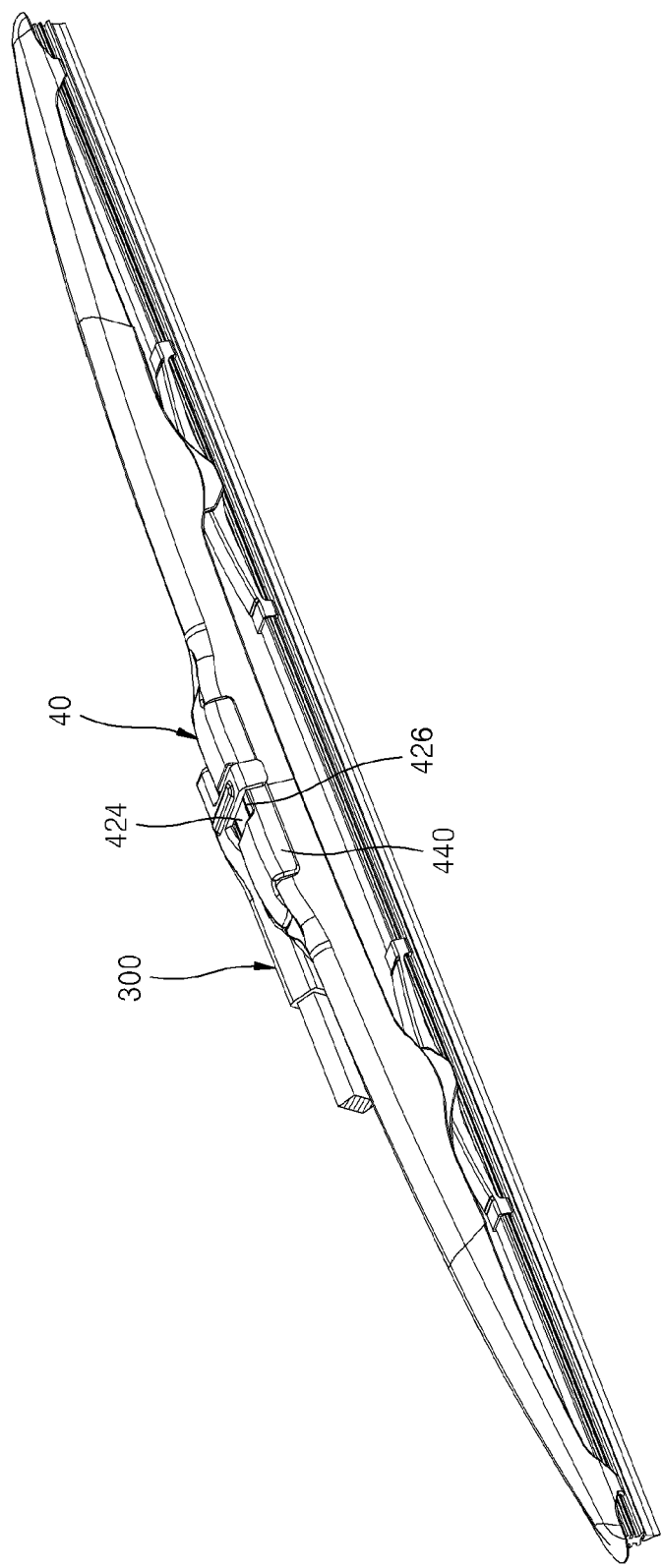
FIG. 8 is a perspective view of a wiper blade device of FIG. 7 seen from another direction.
Figure 9:
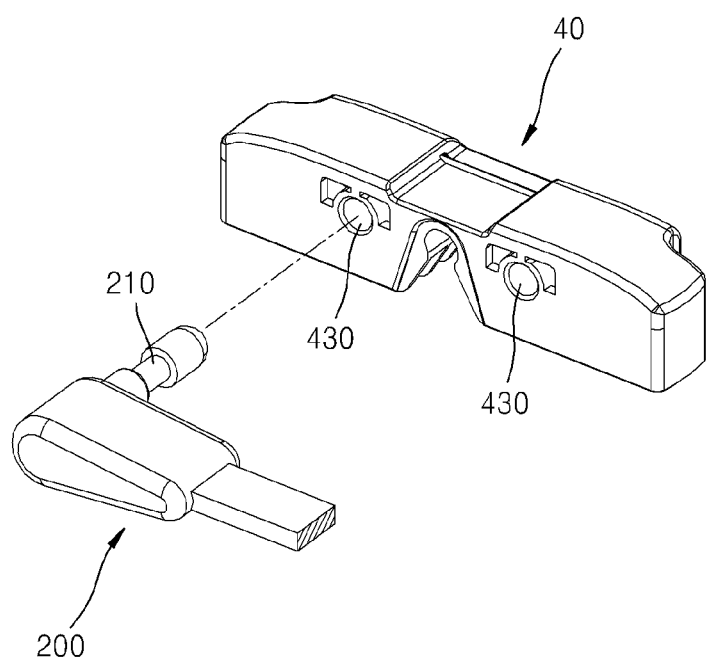
FIG. 9 is an exploded perspective view for explaining a process of combining the clip member of FIG. 1 with a pin arm type wiper.

FIG. 1 is a schematic perspective view of a clip member 40 according to an embodiment of the present invention. FIG. 2 is a schematic perspective view of the clip member 40 of FIG. 1 seen from another direction. FIG. 3 is a schematic perspective view of a wiper blade device 10 having the clip member 40 of FIG. 1. FIG. 4 is an exploded perspective view of a lever member and a clip member that constitute the wiper blade device 10 of FIG. 3. FIG. 5 is a cross-sectional view of the lever member taken along the line V-V of FIG. 4. FIG. 6 is a partial perspective view of a slide-arm type wiper arm structure. FIG. 7 is a perspective view of the wiper blade device 10 in which the wiper arm of FIG. 6 is combined with the clip member 40. FIG. 8 is a perspective view of the wiper blade device 10 of FIG. 7 seen from another direction. FIG. 9 is an exploded perspective view for explaining a process of combining the clip member 40 of FIG. 1 with a pin arm type wiper.

Referring to FIGS. 1 through 9, the clip member 40 may be used to assemble various mounting type wiper arms. According to the current embodiment, the clip member 40 may be a part mounted on a wiper blade device 10 attached to a front part of a vehicle to remove foreign materials from a windshield.

Prior to describing the structure of the clip member 40, the structure of the wiper blade device 10 which accommodates the clip member 40 will now be briefly described.

As depicted in FIG. 3, the wiper blade device 10 includes a wiper lip 20, a yoke 25, a lever member 30, and the clip member 40.

The wiper lip 20 is a member that slidingly contacts a surface of a windshield of a vehicle. The wiper lip 20 may be formed of an elastic rubber material. The wiper lip 20 removes foreign materials from the surface of the windshield. Although not specifically shown in the drawing, a supporting member (a vertebra) having an elastic restoration force makes a shape of the wiper lip 20 remain constant.

The yoke 25 is a structure that connects the wiper lip 20 and the lever member 30 which will be described below. The yoke 25 supports an upper part of the wiper lip 20 and connects the lever member 30 like a bridge.

The lever member 30 includes a spoiler 31 that supports the wiper lip 20 and prevents the wiper lip 20 from rising from the windshield due to wind pressure applied to the wiper lip 20 when the vehicle is driven. A plurality of the lever members 30 may be used. The lever member 30 may be formed of a synthetic resin material. In the current embodiment, the lever member 30 installed at the center of the wiper blade device 10 in the length direction thereof is performs a key role. Hereinafter, the lever member 30 installed at the center of the wiper blade device 10 will be described.

The lever member 30 includes a clip accommodation hole 32 at the center thereof. The clip accommodation hole 32 is formed in the length direction of the wiper blade device 10. The clip accommodation hole 32 accommodates the clip member 40. A pivot axis 33 that is disposed to cross both walls of the clip accommodation hole 32 in a width direction of the lever member 30 is provided in the clip accommodation hole 32. The pivot axis 33 may be formed as one body with the lever member 30, or may be combined with the lever member 30 after being separately formed. The clip accommodation hole 32 passes through upper and lower surfaces of the lever member 30. A horizontal cross-section of the clip accommodation hole 32 may have a rectangular shape.

The lever member 30 includes a first mounting hole 34 and a first popping groove 36.

The first mounting hole 34 is provided at a position separated from the center of the clip accommodation hole 32 in a length direction of the lever member 30. The first mounting hole 34 passes through one of the sidewalls of the clip accommodation hole 32. More specifically, the first mounting hole 34 passes through a sidewall of the sidewalls that constitute the clip accommodation hole 32 in a length direction of the pivot axis 33. The first mounting hole 34 is provided to mount therein a pin arm type wiper arm or a slide arm type wiper arm.

The first popping groove 36 is formed along the same axis of the center line of the first mounting hole 34. As depicted in FIG. 4, the first popping groove 36 is formed in an inner sidewall of the clip accommodation hole 32 opposite the sidewall in which the first mounting hole 34 is formed. The first popping groove 36 includes a neck unit 37. The neck unit 37 constitutes an inner wall of the first popping groove 36 and is connected to the sidewall of the clip accommodation hole 32 in which the first mounting hole 34 is formed. The neck unit 37 may have a thickness t in a range from about 0.3 mm to about 1 mm. The neck unit 37 is provided so that the inner wall of the first popping groove 36 is separated from the lever member 30 by a distance corresponding to a force that can be applied by an adult woman by finger.

The first popping groove 36 and the first mounting hole 34 face each other when the inner wall of the first popping groove 36 is separated from the lever member 30 by a force in a range from about 3 kgf to about 5 kgf that is applied in a width direction of the lever member 30. When a force that is applied to the inner wall of the first popping groove 36 is less than 3 kgf, that is, the force that is applied to the inner wall of the first popping groove 36 is weaker than a force that may be exerted by an adult woman by finger, the inner wall of the first popping groove 36 is not separated from the lever member 30. However, when a force that is applied to the inner wall of the first popping groove 36 is greater than 5 kgf, the force exceeds the range of force by which the inner wall of the first popping groove 36 is separated from the lever member 30, and thus, an unnecessary external force is applied.

A pin arm type wiper arm or a slide arm type wiper arm may be mounted on the lever member 30 through the first mounting hole 34 and the first popping groove 36. The pin arm type wiper arm or the slide arm type wiper arm may be combined with the lever member 30 in tandem with the clip member 40 that is accommodated between the first mounting hole 34 and the first popping groove 36.

The lever member 30 may include a second mounting hole 35 and a second popping groove 38 as constituent elements corresponding to the first mounting hole 34 and the first popping groove 36. If the first mounting hole 34 and the first popping groove 36 are used in the case of a left-hand drive (LHD) vehicle, the second mounting hole 35 and the second popping groove 38 may be used in the case of a right-hand drive (RHD) vehicle.

The second mounting hole 35 is symmetrically formed with respect to the first mounting hole 34 based on the center of the lever member 30 in the length direction thereof. The second mounting hole 35 has the same structure as the first mounting hole 34.

The second popping groove 38 is symmetrically formed with respect to the first popping groove 36 based on the center of the lever member 30 in the length direction thereof. The second popping groove 38 has the same structure as the first popping groove 36.

The first mounting hole 34, the first popping groove 36, the second mounting hole 35, and the second popping groove 38 are used for mounting a slide arm type wiper arm 300 as depicted in FIG. 6 or a pin arm type wiper arm 200 as depicted in FIG. 9.

The clip member 40 is combined at the central part of the lever member 30. That is, the clip member 40 is disposed at the center of the wiper blade device 10 in the length direction thereof. The clip member 40 is rotatably mounted on the lever member 30 of the wiper blade device 10. The clip member 40 may be used to mount at least two types of wiper arms.

The clip member 40 includes a main body 420, a coupling groove unit 422, a first mounting unit 424, a second mounting unit 430, and a third mounting unit 440.

The main body 420 is a basic frame of the clip member 40. The main body 420 may be formed of a synthetic resin material, such as polypropylene (PP).

The combination groove unit 422 is a groove unit that is attachably and detachably combined with the pivot axis 33 provided on the lever member 30. The combination groove unit 422 is combined with the pivot axis 33 to be able to slide on an outer circumference of the pivot axis 33. Accordingly, the clip member 40 is rotatably accommodated in the clip accommodation hole 32 in the lever member 30 in the wiper blade device 10.

The first mounting unit 424 is formed on an upper surface of the main body 420. The first mounting unit 424 is used for combining the slide arm type wiper arm 300 depicted in FIGS. 6 through 8. The first mounting unit 424 is a concave groove that extends in a width direction of the main body 420. A moving prevention bead 426 is provided on the first mounting unit 424. The moving prevention bead 426 is convexly formed on the first mounting unit 424. The moving prevention bead 426 is a bead type structure extending in a length direction of the main body 420. The moving prevention bead 426 prevents moving of the slide arm type wiper arm 300 until the slide arm type wiper arm 300 is combined with the clip member 40. That is, the moving prevention bead 426 prevents a movement of the slide arm type wiper arm 300 by applying a pressure to the slide arm type wiper arm 300.

The second mounting unit 430 is formed on a sidewall of the main body 420. The second mounting unit 430 is a hole that passes through the main body 420 in a width direction of the main body 420. The second mounting unit 430 is formed at a position separated in a length direction of the main body 420 from the combination groove unit 422 to be combined with pin units 210 or 310 of the pin arm type wiper arm 200 or the slide arm type wiper arm 300. In the current embodiment, the second mounting unit 430 of a LHD vehicle and that of RHD vehicle are symmetrically formed.

The third mounting unit 440 is formed on an outer side from one of both side surfaces of the main body 420 opposite the wiper arm. The third mounting unit 440 is a flange type structure connected to an upper part of the main body 420. The third mounting unit 440 is combined with a sidewall of the clip accommodation hole 32 formed on the lever member 30 like a hat wearing shape. The third mounting unit 440 is provided so that the wiper arm cannot move in a width direction of the clip member 40 when the slide arm type wiper arm 300 depicted in FIGS. 6 through 8 is combined with the clip member 40. The slide arm type wiper arm 300 includes a hook unit 320 as depicted in FIG. 6 for hooking the slide arm type wiper arm 300 to the third mounting unit 440.

Hereinafter, the effect of the clip member 40 having the above configuration will now be described in detail when the clip member 40 is combined with the slide arm type wiper arm 300 and is combined with the pin arm type wiper arm 200 respectively.

First, a process of combining the slide arm type wiper arm 300 with the clip member 40 will be described with reference to FIGS. 6 through 8.

Referring to FIG. 6, an edge unit of the slide arm type wiper arm 300 includes a pin unit 310 and the hook unit 320. A method of combining the slide arm type wiper arm 300 with the wiper blade device 10 is as follows. The pin unit 310 of the slide arm type wiper arm 300 is inserted into the first mounting hole 34 of the lever member 30, the second mounting unit 430 of the clip member 40, and the first popping groove 36. In this process, the hook unit 320 is hooked to the third mounting unit 440 by slidingly passing through the first mounting unit 424. FIGS. 7 and 8 show the slide arm type wiper arm 300 in which the lever member 30 is combined with the clip member 40. The slide arm type wiper arm 300 assembled as described above is prevented from moving in up and down directions of the main body 420 by the moving prevention bead 426.

A process of combining the pin arm type wiper arm 200 with the clip member 40 will be described with reference to FIG. 9.

As depicted in FIG. 9, an edge unit of the pin arm type wiper arm 200 includes a pin unit 210 protruding in a width direction of the clip member 40. The clip member 40 allows the pin unit 210 of the pin arm type wiper arm 200 to sequentially pass through the first mounting hole 34 of the lever member 30, the second mounting unit 430 of the clip member 40, and the first popping groove 36 of the lever member 30 in a state where the clip member 40 is combined with the clip accommodation hole 32. Thus, assembling of the pin arm type wiper arm 200 with the clip member 40 is completed.

A clip member according to the current embodiment allows a wiper blade device to be readily mounted on a vehicle according to a driver's taste regardless of the wiper arm type already mounted on the vehicle, thereby expanding the selection choices of the user, and thus, satisfying the user's demand. That is, the clip member may be used for mounting various mounting types of wiper arms, and according to the current embodiment, is configured to allow mounting of at least two types of wiper blades. Thus, a driver may use any type of wiper blade devices according to his/her taste regardless of the type of vehicles.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A clip member for mounting various types of wiper arms, the clip member being rotatably mounted at a center of a wiper blade device in a length direction thereof, the clip member comprising:
    a main body;
    a combination groove unit that is attachably and detachably combined with a pivot axis provided on a lever member to be rotatably accommodated in a clip accommodation hole that is formed in the lever member in the wiper blade device;
    a first mounting unit that is a concave groove formed in an upper surface of the main body, extends in a width direction of the main body, and is combinable with a slide-arm wiper arm;
    a second mounting unit that is a hole passing through sidewalls of the main body in the width direction of the main body and is formed at a position of the clip member separated from the combination groove unit in a length direction of the main body to be combined with a pin unit of the slide-arm wiper arm or a pin-arm wiper arm; and
    a third mounting unit that is formed on an outer side from one of both side surfaces of the main body opposite the wiper arm and that has a flange structure connected to and extending downwardly from an upper part of the main body to wrap around a sidewall of the clip accommodation hole in the manner of a hat.

2. The clip member of claim 1, further comprising a moving prevention bead that is convexly formed on the first mounting unit, has a bead structure extending in the length direction of the main body, and prevents moving of the slide-arm arm wiper arm until the slide-arm wiper arm is combined with the clip member.

* * * * *